(12) United States Patent
Belelie et al.

(10) Patent No.: US 7,559,639 B2
(45) Date of Patent: Jul. 14, 2009

(54) RADIATION CURABLE INK CONTAINING A CURABLE WAX

(75) Inventors: Jennifer Lynne Belelie, Oakville (CA); Peter Gordon Odell, Mississauga (CA); Christopher A. Wagner, Toronto (CA); C. Geoffrey Allen, Waterdown (CA)

(73) Assignee: Xerox Corporation, Norwalk, CT (US)

( * ) Notice: Subject to any disclaimer, the term of this patent is extended or adjusted under 35 U.S.C. 154(b) by 458 days.

(21) Appl. No.: 11/289,615

(22) Filed: Nov. 30, 2005

(65) Prior Publication Data

US 2007/0120925 A1 May 31, 2007

(51) Int. Cl.
*G01D 11/00* (2006.01)
(52) U.S. Cl. .................... 347/100; 347/101; 347/102
(58) Field of Classification Search ............. 347/100, 347/95, 96, 101, 102; 106/31.6, 31.13, 31.27; 523/160
See application file for complete search history.

(56) References Cited

U.S. PATENT DOCUMENTS

| | | | |
|---|---|---|---|
| 5,279,655 A * | 1/1994 | Takazawa et al. | 106/31.43 |
| 5,372,852 A | 12/1994 | Titterington et al. | |
| 6,441,056 B2 * | 8/2002 | Keller | 106/31.6 |
| 6,547,380 B2 | 4/2003 | Smith et al. | |
| 6,586,492 B1 * | 7/2003 | Caiger et al. | 522/75 |
| 2002/0149659 A1 * | 10/2002 | Wu et al. | 347/102 |
| 2006/0270754 A1 * | 11/2006 | Belelie et al. | 523/160 |

OTHER PUBLICATIONS

U.S. Appl. No. 11/034,850, filed Jan. 14, 2005, Odell et al.
U.S. Appl. No. 11/034,856, filed Jan. 14, 2005, Odell et al.
U.S. Appl. No. 11/034,714, filed Jan. 14, 2005, Belelie et al.
U.S. Appl. No. 11/018,378, filed Dec. 22, 2004, Odell et al.
U.S. Appl. No. 11/034,866, filed Jan. 14, 2005, Breton et al.
Kirk-Othmer, "Encyclopedia of Chemical Technology," Fourth Edition, vol. 8, pp. 223-237, 1993.

* cited by examiner

*Primary Examiner*—Manish S Shah
(74) *Attorney, Agent, or Firm*—Oliff & Berridge, PLC

(57) ABSTRACT

Curable monomer that is liquid at 25° C., curable wax and colorant together from a radiation curable ink. This ink may be used to form images by providing the radiation curable ink at a first temperature; applying the radiation curable ink to the substrate to form an image, the substrate being at a second temperature, which is below the first temperature; and exposing the radiation curable ink to radiation to cure the ink.

3 Claims, 1 Drawing Sheet

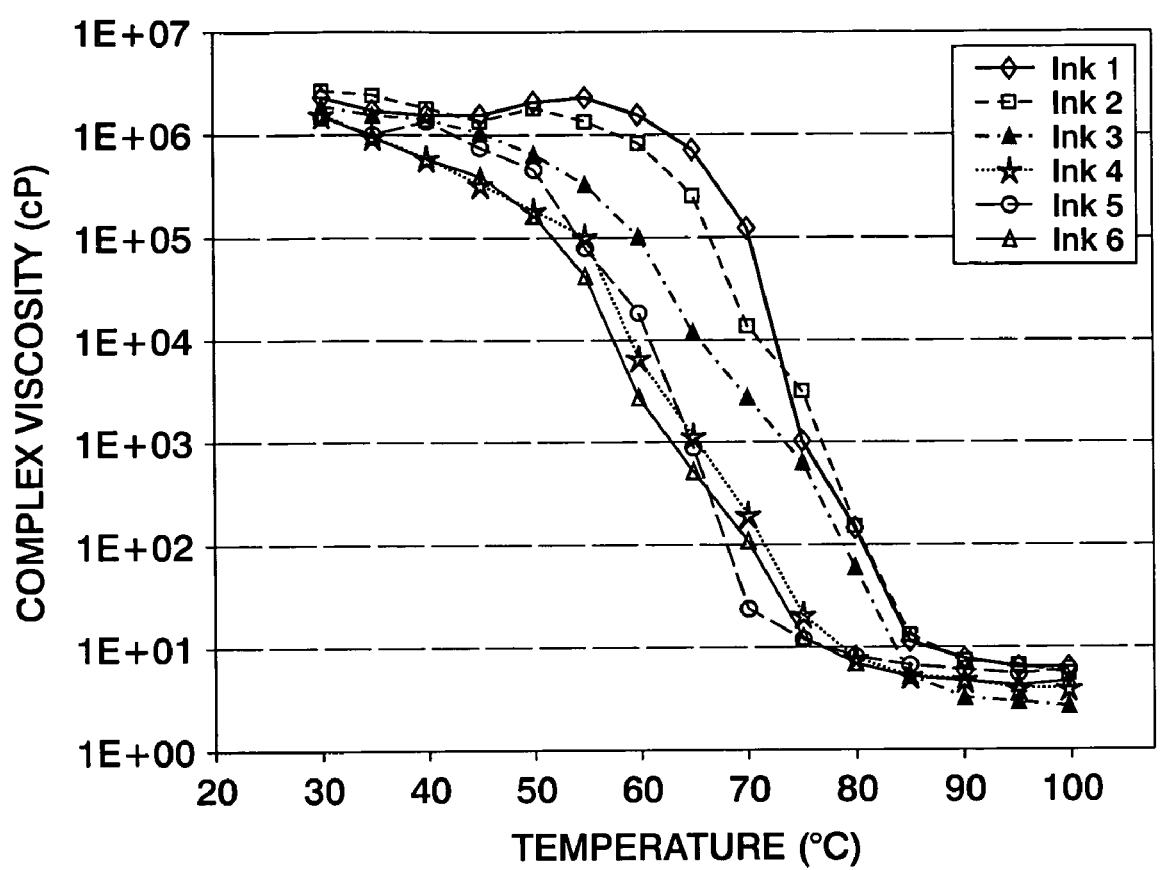

RADIATION CURABLE INK CONTAINING A CURABLE WAX

BACKGROUND

The present disclosure generally relates to curable inks, particularly curable phase change inks, and their use in methods for forming images, particularly their use in ink jet printing.

Ink jetting devices are known in the art, and thus extensive description of such devices is not required herein. As described in U.S. Pat. No. 6,547,380, incorporated herein by reference, ink jet printing systems generally are of two types: continuous stream and drop-on-demand. In continuous stream ink jet systems, ink is emitted in a continuous stream under pressure through at least one orifice or nozzle. The stream is perturbed, causing it to break up into droplets at a fixed distance from the orifice. At the break-up point, the droplets are charged in accordance with digital data signals and passed through an electrostatic field that adjusts the trajectory of each droplet in order to direct it to a gutter for recirculation or a specific location on a recording medium. In drop-on-demand systems, a droplet is expelled from an orifice directly to a position on a recording medium in accordance with digital data signals. A droplet is not formed or expelled unless it is to be placed on the recording medium.

There are at least three types of drop-on-demand ink jet systems. One type of drop-on-demand system is a piezoelectric device that has as its major components an ink filled channel or passageway having a nozzle on one end and a piezoelectric transducer near the other end to produce pressure pulses. Another type of drop-on-demand system is known as acoustic ink printing. As is known, an acoustic beam exerts a radiation pressure against objects upon which it impinges. Thus, when an acoustic beam impinges on a free surface (i.e., liquid/air interface) of a pool of liquid from beneath, the radiation pressure which it exerts against the surface of the pool may reach a sufficiently high level to release individual droplets of liquid from the pool, despite the restraining force of surface tension. Focusing the beam on or near the surface of the pool intensifies the radiation pressure it exerts for a given amount of input power. Still another type of drop-on-demand system is known as thermal ink jet, or bubble jet, and produces high velocity droplets. The major components of this type of drop-on-demand system are an ink filled channel having a nozzle on one end and a heat generating resistor near the nozzle. Printing signals representing digital information originate an electric current pulse in a resistive layer within each ink passageway near the orifice or nozzle, causing the ink vehicle (usually water) in the immediate vicinity to vaporize almost instantaneously and create a bubble. The ink at the orifice is forced out as a propelled droplet as the bubble expands.

In the art, it is known to use phase change inks, also referred to as hot-melt inks. In general, phase change inks are in the solid phase at, for example, ambient temperature, but exist in the liquid phase at the elevated operating temperature of an ink jet printing device. At the jet operating temperature, droplets of liquid ink are ejected from the printing device and, when the ink droplets contact the surface of the recording substrate, either directly or via an intermediate heated transfer belt or drum, they quickly solidify to form a predetermined pattern of solidified ink drops.

In a typical design of a piezoelectric ink jet device utilizing phase change inks printing directly on a substrate or on an intermediate transfer member, such as the one described in U.S. Pat. No. 5,372,852, incorporated herein by reference, the image is applied by jetting appropriately colored inks during four to eighteen rotations (incremental movements) of a substrate (an image receiving member or intermediate transfer member) with respect to the ink jetting head, i.e., there is a small translation of the printhead with respect to the substrate in between each rotation. This approach simplifies the printhead design, and the small movements ensure good droplet registration. At the jet operating temperature, droplets of liquid ink are ejected from the printing device and, when the ink droplets contact the surface of the recording substrate, either directly or via an intermediate heated transfer belt or drum, they quickly solidify to form a predetermined pattern of solidified ink drops.

Hot melt inks typically used with ink jet printers have a wax based ink vehicle, e.g., a crystalline wax. Such solid ink jet inks provide vivid color images. In typical systems, these crystalline wax inks partially cool on an intermediate transfer member and are then pressed into the image receiving medium such as paper. Transfuse spreads the image droplet, providing a richer color and lower pile height. The low flow of the solid ink also prevents showthrough on the paper.

In these systems, the crystalline wax inks are jetted onto a transfer member, for example, an aluminum drum, at temperatures of approximately 130-140° C. The wax based inks are heated to such high temperatures to decrease their viscosity for efficient and proper jetting onto the transfer member. The transfer member is at approximately 60° C., so that the wax will cool sufficiently to solidify or crystallize. As the transfer member rolls over the recording medium, e.g., paper, the image comprised of wax based ink is pressed into the paper.

The images produced with inks composed of crystalline waxes are visually appealing; however, lowering the temperature at which the inks are jetted and improving the robustness of the printed images would be beneficial.

Recently, Xerox has discovered several curable inks that that achieve more robust images following curing. Reference is made to the following patent properties, each of which is incorporated herein by reference in its entirety:

(1) Co-pending application Ser. No. 11/034,850 filed Jan. 14, 2005; (2) Co-pending application Ser. No. 11/034,856 filed Jan. 14, 2005; (3) Co-pending application Ser. No. 11/034,714 filed Jan. 14, 2005; (4) Co-pending application Ser. No. 11/018,378 filed Dec. 22, 2004; and (5) Co-pending application Ser. No. 11/034,866 filed Jan. 14, 2005.

SUMMARY

The present disclosure describes a radiation curable ink, particularly a radiation curable phase change ink, that can be used in ink jet printing.

In embodiments, the present disclosure relates to a radiation curable ink comprising a curable monomer that is liquid at 25° C., a curable wax, and a colorant. In embodiments, the ink further comprises at least one radiation activated initiator, specifically a photoinitiator, that initiates polymerization of curable components of the ink, specifically of the curable monomer and the curable wax.

As used herein, the term wax includes natural, modified natural, and synthetic waxes. A wax is solid at room temperature, specifically at 25° C.

In embodiments, the curable monomer has a viscosity of no more than 20 mPa-s, preferably no more than 18 mPa-s, and more preferably no more than 16 mPa-s at 25° C.

The present disclosure also relates to a method for applying ink to form an image on a substrate. In embodiments, the method comprises providing a radiation curable ink described herein at a first temperature; applying the radiation curable ink to a substrate to form an image, the substrate being at a second temperature, which is below the first temperature; and exposing the radiation curable ink to radiation to cure the ink. During the curing process, curable components of the ink are polymerized to form a cured image. In a preferred embodiment, the composition is applied over the image by ink jet printing.

BRIEF DESCRIPTION OF THE DRAWING

The FIGURE depicts the viscosities of six compositions within the present disclosure.

DETAILED DESCRIPTION OF EMBODIMENTS

The composition of the present disclosure is a radiation curable ink. In embodiments, the radiation curable ink comprises a curable monomer that is liquid at 25° C., a curable wax, and a colorant. In embodiments, the curable monomer has a viscosity of no more than 20 mPa-s, preferably no more than 18 mPa-s, and more preferably no more than 16 mPa-s at 25° C.

In embodiments, the ink has a viscosity of from 8 mPa-s to 15 mPa-s, preferably from 10 mPa-s to 12 mPa-s, at a temperature between 60° C. and 100° C. In embodiments, the ink has a viscosity of from $10^5$ to $10^7$ mPa-s at a temperature of 50° C. or below, specifically at a temperature from 0° C. to 50° C.

The curable monomer may be any curable monomer that is a liquid at 25° C. In embodiments, the monomer is equipped with one or more curable moieties, including, but not limited to, acrylates; methacrylates; alkenes; allylic ethers; vinyl ethers; epoxides, such as cycloaliphatic epoxides, aliphatic epoxides, and glycidyl epoxides; oxetanes; and the like. The monomers are preferably monoacrylates, diacrylates, or polyfunctional alkoxylated or polyalkoxylated acrylic monomers comprising one or more di- or tri-acrylates.

Suitable monoacrylates are, for example, cyclohexyl acrylate, 2-ethoxy ethyl acrylate, 2-methoxy ethyl acrylate, 2(2-ethoxyethoxy) ethyl acrylate, tetrahydrofurfuryl acrylate, octyl acrylate, lauryl acrylate, 2-phenoxy ethyl acrylate, tertiary butyl acrylate, glycidyl acrylate, isodecyl acrylate, benzyl acrylate, hexyl acrylate, isooctyl acrylate, isobornyl acrylate, butanediol monoacrylate, octyl decyl acrylate, ethoxylated nonylphenol acrylate, hydroxyethyl acrylate, hydroxyethyl methacrylate, and the like. Suitable polyfunctional alkoxylated or polyalkoxylated acrylates are, for example, alkoxylated, preferably, ethoxylated, or propoxylated, variants of the following: neopentyl glycol diacrylates, butanediol diacrylates, 1,3-butylene glycol diacrylate, 1,4-butanediol diacrylate, diethylene glycol diacrylate, 1,6-hexanediol diacrylate, tetraethylene glycol diacrylate, triethylene glycol diacrylate, tripropylene glycol diacrylate, propoxylated neopentyl glycol diacrylate, ethoxylated neopentyl glycol diacrylate, and the like. In the most preferred embodiment, the monomer is a propoxylated neopentyl glycol diacrylate, such as, for example, SR-9003 (Sartomer Co., Inc., Exton, Pa.), having the structure:

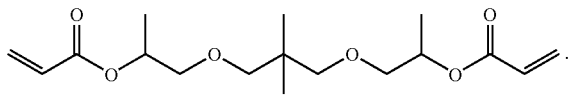

Suitable reactive monomers are likewise commercially available from, for example, Sartomer Co., Inc., Henkel Corp., Radcure Specialties, and the like.

The curable monomer is preferably included in the ink in an amount of from, for example, about 20 to about 80% by weight of the ink, preferably about 30 to about 70% by weight of the ink, and more preferably from about 35 to about 60% by weight of the ink.

The curable wax may be any wax component that is miscible with the other components and that will polymerize with the curable monomer to form a polymer. Inclusion of the wax promotes an increase in viscosity of the ink as it cools from the jetting temperature.

Suitable examples of waxes include, but are not limited to, those that are functionalized with curable groups. The curable groups may include, but are not limited to, acrylate, methacrylate, alkene, allylic ether, epoxide and oxetane. These waxes can be synthesized by the reaction of a wax equipped with a transformable functional group, such as carboxylic acid or hydroxyl.

Suitable examples of hydroxyl-terminated polyethylene waxes that may be functionalized with a curable group include, but are not limited to, mixtures of carbon chains with the structure $CH_3$—$(CH_2)_n$—$CH_2OH$, where there is a mixture of chain lengths, n, where the average chain length is preferably in the range of about 16 to about 50, and linear low molecular weight polyethylene, of similar average chain length. Suitable examples of such waxes include, but are not limited to, UNILIN® 350, UNILIN® 425, UNILIN® 550 and UNILIN® 700 with $M_n$ approximately equal to 375, 460, 550 and 700 g/mol, respectively. All of these waxes are commercially available from Baker-Petrolite. Guerbet alcohols, characterized as 2,2-dialkyl-1-ethanols, are also suitable compounds. Preferred Guerbet alcohols include those containing 16 to 36 carbons, many of which are commercially available from Jarchem Industries Inc., Newark, N.J. PRIPOL® 2033 (C-36 dimer diol mixture including isomers of the formula

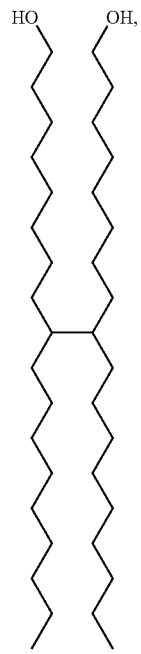

as well as other branched isomers which may include unsaturations and cyclic groups, available from Uniqema, New Castle, Del.; further information on $C_{36}$ dimer diols of this type is disclosed in, for example, "Dimer Acids," *Kirk-Othmer Encyclopedia of Chemical Technology*, Vol. 8, 4th Ed. (1992), pp. 223 to 237, the disclosure of which is totally incorporated herein by reference) can also be used. These alcohols can be reacted with carboxylic acids equipped with UV curable moieties to form reactive esters. Examples of these acids include, but are not limited to, acrylic and methacrylic acids, available from Sigma-Aldrich Co. Particularly preferred curable monomers include acrylates of UNILIN® 350, UNILIN® 425, UNILIN® 550 and UNILIN® 700.

Suitable examples of carboxylic acid-terminated polyethylene waxes that may be functionalized with a curable group include, but are not limited to, mixtures of carbon chains with the structure $CH_3$—$(CH_2)_n$—COOH, where there is a mixture of chain lengths, n, where the average chain length is preferably in the range of about 16 to about 50, and linear low molecular weight polyethylene, of similar average chain length. Suitable examples of such waxes include, but are not limited to, UNICID® 350, UNICID® 425, UNICID® 550 and UNICID® 700 with $M_n$ equal to approximately 390, 475, 565 and 720 g/mol, respectively. Other suitable waxes have a structure $CH_3$—$(CH_2)_n$—COOH, such as hexadecanoic or palmitic acid with n=14, heptadecanoic or margaric or daturic acid with n=15, octadecanoic or stearic acid with n=16, eicosanoic or arachidic acid with n=18, docosanoic or behenic acid with n=20, tetracosanoic or lignoceric acid with n=22, hexacosanoic or cerotic acid with n=24, heptacosanoic or carboceric acid with n=25, octacosanoic or montanic acid with n=26, triacontanoic or melissic acid with n=28, dotriacontanoic or lacceroic acid with n=30, tritriacontanoic or ceromelissic or psyllic acid, with n=31, tetratriacontanoic or geddic acid with n=32, pentatriacontanoic or ceroplastic acid with n=33. Guerbet acids, characterized as 2,2-dialkyl ethanoic acids, are also suitable compounds. Preferred Guerbet acids include those containing 16 to 36 carbons, many of which are commercially available from Jarchem Industries Inc., Newark, N.J. PRIPOL® 1009 (C-36 dimer acid mixture including isomers of the formula

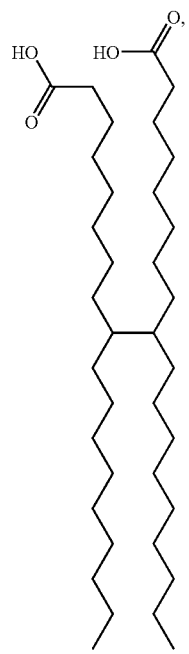

as well as other branched isomers which may include unsaturations and cyclic groups, available from Uniqema, New Castle, Del.; further information on $C_{36}$ dimer acids of this type is disclosed in, for example, "Dimer Acids," *Kirk-Othmer Encyclopedia of Chemical Technology*, Vol. 8, 4$^{th}$ Ed. (1992), pp. 223 to 237, the disclosure of which is totally incorporated herein by reference) can also be used. These carboxylic acids can be reacted with alcohols equipped with UV curable moieties to form reactive esters. Examples of these alcohols include, but are not limited to, 2-allyloxyethanol from Sigma-Aldrich Co.;

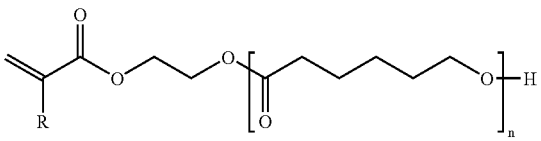

TONE M-101 (R=H, $n_{avg}$=1), TONE M-100 (R=H, $n_{avg}$=2) and TONE M-201 (R=Me, $n_{avg}$=1) from The Dow Chemical Company; and CD572 (R=H, n=10) and SR604 (R=Me, n=4) from Sartomer Company, Inc.

The curable wax is preferably included in the ink in an amount of from, for example, about 15 to about 70% by weight of the ink, preferably about 20 to about 60% by weight of the ink, and more preferably from about 25 to about 50% by weight of the ink.

The curable monomer and curable wax together preferably form more than 50% by weight of the ink, preferably at least 70% by weight of the ink, and more preferably at least 80% by weight of the ink. The weight ratio of curable monomer to curable wax may be, for example, from about 0.7:1 to about 3:1, preferably from about 0.75:1 to about 2.5:1.

Any desired or effective colorant can be employed in the inks, including dyes, pigments, mixtures thereof, and the like, provided that the colorant can be dissolved or dispersed in the ink vehicle. The compositions can be used in combination with conventional ink colorant materials, such as Color Index (C.I.) Solvent Dyes, Disperse Dyes, modified Acid and Direct Dyes, Basic Dyes, Sulphur Dyes, Vat Dyes, and the like.

Examples of suitable dyes include, but are not limited to, Eastman olefin, Usharect Blue 86 (Direct Blue 86), available from Ushanti Color; Intralite Turquoise 8GL (Direct Blue 86), available from Classic Dyestuffs; Chemictive Brilliant Red 7BH (Reactive Red 4), available from Chemiequip; Levafix Black EB, available from Bayer; Reactron Red H8B (Reactive Red 31), available from Atlas Dye-Chem; D&C Red #28 (Acid Red 92), available from Warner-Jenkinson; Direct Brilliant Pink B, available from Global Colors; Acid Tartrazine, available from Metrochem Industries; Cartasol Yellow 6GF Clariant; Carta Blue 2GL, available from Clariant; and the like. Particularly preferred are solvent dyes; within the class of solvent dyes, spirit soluble dyes are preferred because of their compatibility with the ink vehicles of the present invention. Examples of suitable spirit solvent dyes include Neozapon Red 492 (BASF); Orasol Red G (Ciba); Direct Brilliant Pink B (Global Colors); Aizen Spilon Red C-BH (Hodogaya Chemical); Kayanol Red 3BL (Nippon Kayaku); Spirit Fast Yellow 3G; Aizen Spilon Yellow C-GNH (Hodogaya Chemical); Cartasol Brilliant Yellow 4GF (Clariant); Pergasol Yellow CGP (Ciba); Orasol Black RLP (Ciba); Savinyl Black RLS (Clariant); Morfast Black Conc. A (Rohm and Haas); Orasol Blue GN (Ciba); Savinyl Blue GLS (Sandoz); Luxol Fast Blue MBSN (Pylam); Sevron Blue 5GMF (Classic Dyestuffs); Basacid Blue 750 (BASF), and the like.

Neozapon Black X51 [C.I. Solvent Black, C.I. 12195] (BASF), Sudan Blue 670 [C.I. 61554] (BASF), Sudan Yellow 146 [C.I. 12700] (BASF), and Sudan Red 462 [C.I. 260501] (BASF) are preferred.

Pigments are also suitable colorants for the inks. Examples of suitable pigments include, but are not limited to, Violet PALIOGEN Violet 5100 (BASF); PALIOGEN Violet 5890 (BASF); HELIOGEN Green L8730 (BASF); LITHOL Scarlet D3700 (BASF); Sunfast® Blue 15:4 (Sun Chemical 249-0592); Hostaperm Blue B2G-D (Clariant); Permanent Red P-F7RK; Hostaperm Violet BL (Clariant); LITHOL Scarlet 4440 (BASF); Bon Red C (Dominion Color Company); ORACET Pink RF (Ciba); PALIOGEN Red 3871 K (BASF); Sunfast® Blue 15:3 (Sun Chemical 249-1284); PALIOGEN Red 3340 (BASF); Sunfast® Carbazole Violet 23 (Sun Chemical 246-1670); LITHOL Fast Scarlet L4300 (BASF); Sunbrite Yellow 17 (Sun Chemical 275-0023); HELIOGEN Blue L6900, L7020 (BASF); Sunbrite Yellow 74 (Sun Chemical 272-0558); Spectra Pac® C Orange 16 (Sun Chemical 276-3016); HELIOGEN Blue K6902, K6910 (BASF); Sunfast® Magenta 122 (Sun Chemical 228-0013); HELIOGEN Blue D6840, D7080 (BASF); Sudan Blue OS (BASF); NEOPEN Blue FF4012 (BASF); PV Fast Blue B2GO1 (Clariant); IRGALITE Blue BCA (Ciba); PALIOGEN Blue 6470 (BASF); Sudan Orange G (Aldrich), Sudan Orange 220 (BASF); PALIOGEN Orange 3040 (BASF); PALIOGEN Yellow 152, 1560 (BASF); LITHOL Fast Yellow 0991 K (BASF); PALIOTOL Yellow 1840 (BASF); NOVOPERM Yellow FGL (Clariant); Lumogen Yellow D0790 (BASF); Suco-Yellow L1250 (BASF); Suco-Yellow D1355 (BASF); Suco Fast Yellow D1 355, D1 351 (BASF); HOSTAPERM Pink E 02 (Clariant); Hansa Brilliant Yellow 5GX03 (Clariant); Permanent Yellow GRL 02 (Clariant); Permanent Rubine L6B 05 (Clariant); FANAL Pink D4830 (BASF); CINQUASIA Magenta (DU PONT), PALIOGEN Black L0084 (BASF); Pigment Black K801 (BASF); and carbon blacks such as REGAL 330™. (Cabot), Carbon Black 5250, Carbon Black 5750 (Columbia Chemical), mixtures thereof and the like.

The colorant is preferably included in the ink in an amount of from, for example, about 0.1 to about 15% by weight of the ink, preferably about 0.5 to about 6% by weight of the ink.

Radiation curable as used herein is intended to cover all forms of curing upon exposure to a radiation source, including light and heat sources and including in the presence or absence of initiators. Example radiation curing routes include, but are not limited to, curing using ultraviolet (UV) light, for example having a wavelength of 200-400 nm or more rarely visible light, preferably in the presence of photoinitiators and/or sensitizers, curing using e-beam radiation, preferably in the absence of photoinitiators, curing using thermal curing, in the presence or absence of high temperature thermal initiators (and which are preferably largely inactive at the jetting temperature), and appropriate combinations thereof.

In embodiments, the composition further comprises an initiator, preferably a photoinitiator, that initiates polymerization of curable components of the ink, including the curable monomer and the curable wax. The initiator should be soluble in the composition. In preferred embodiments, the initiator is a UV-activated photoinitiator.

In embodiments, the initiator is a radical initiator. Examples of suitable radical photoinitiators include, but are not limited to, ketones such as benzyl ketones, monomeric hydroxyl ketones, polymeric hydroxyl ketones, and α-amino ketones; acyl phosphine oxides, metallocenes, benzophenones, such as 2,4,6-trimethylbenzophenone and 4-methylbenzophenone; and thioxanthenones, such as 2-isopropyl-9H-thioxanthen-9-one. A preferred ketone is 1-[4-(2-hydroxyethoxy)-phenyl]-2-hydroxy-2-methyl-1-propane-1-one. In a preferred embodiment, the ink contains an α-amino ketone, 1-[4-(2-hydroxyethoxy)-phenyl]-2-hydroxy-2-methyl-1-propane-1-one and 2-isopropyl-9H-thioxanthen-9-one.

In other embodiments, the initiator is a cationic initiator. Examples of suitable cationic photoinitiators include, but are not limited to, aryldiazonium salts, diaryliodonium salts, triarysulfonium salts, triarylselenonium salts, dialkylphenacylsulfonium salts, triarylsulphoxonium salts and aryloxydiarylsulfonium salts.

The total amount of initiator included in the ink may be from, for example, about 0.5 to about 15%, preferably from about 1 to about 10%, by weight of the ink.

In embodiments, the ink further comprises a curable oligomer. Suitable curable oligomers include, but are not limited to, acrylated polyesters, acrylated polyethers, acrylated epoxies, urethane acrylates, and pentaerythritol tetraacrylate. Specific examples of suitable acrylated oligomers include, but are not limited to, acrylated polyester oligomers, such as CN2262 (Sartomer Co.), EB 812 (UCB Chemicals), CN2200 (Sartomer Co.), CN2300 (Sartomer Co.), and the like, acrylated urethane oligomers, such as EB270 (UCB Chemicals), EB 5129 (UCB Chemicals), CN2920 (Sartomer Co.), CN3211 (Sartomer Co.), and the like, acrylated epoxy oligomers, such as EB 600 (UCB Chemicals), EB 3411 (UCB Chemicals), CN2204 (Sartomer Co.), CN110 (Sartomer Co.), and the like; and pentaerythritol tetraacrylate oligomers, such as SR399LV (Sartomer Co.) and the like.

The total amount of curable oligomer included in the ink may be from, for example, about 0.5 to about 15%, preferably from about 1 to about 10%, by weight of the ink.

The ink may contain optional additives. Optional additives include, but are not limited to, surfactants, light stabilizers, UV absorbers, which absorb incident UV radiation and convert it to heat energy that is ultimately dissipated, antioxidants, optical brighteners, which can improve the appearance of the image and mask yellowing, thixotropic agents, dewetting agents, slip agents, foaming agents, antifoaming agents, flow agents, waxes, oils, plasticizers, binders, electrical conductive agents, fungicides, bactericides, organic and/or inorganic filler particles, leveling agents, e.g., agents that create or reduce different gloss levels, opacifiers, antistatic agents, dispersants, and the like. In particular, the composition may include, as a stabilizer, a radical scavenger, such as Irgastab UV 10 (Ciba Specialty Chemicals, Inc.). The composition may also include an inhibitor, preferably a hydroquinone, to stabilize the composition by prohibiting or, at least, delaying, polymerization of the oligomer and monomer components during storage, thus increasing the shelf life of the composition. However, additives may negatively affect cure rate, and thus care must be taken when formulating a composition using optional additives.

The total amount of other additives included in the ink may be from, for example, about 0.5 to about 15%, preferably from about 1 to about 10%, by weight of the ink.

The inks described herein may be applied to a substrate to form an image. In embodiments, the method comprises providing a radiation curable ink described herein at a first temperature; applying the radiation curable ink to the substrate to form an image, the substrate being at a second temperature, which is below the first temperature; and exposing the radiation curable ink to radiation to cure the ink. During the curing process, the curable monomer and the curable wax, optionally with other curable components, such as the optional curable oligomer, are polymerized to form a cured image.

In a preferred embodiment, the composition is applied over the image by ink jet printing. The inks described herein are preferably jetted at temperatures of about 50° C. to about 110° C., preferably about 60° C. to about 100° C. The jetting temperature must be within the range of thermal stability of the composition, to prevent premature polymerization in the print head. At jetting, the inks preferably have a viscosity of from about 8 mPa-s to about 15 mPa-s, more preferably about 10 mPa-s to about 12 mPa-s. The inks are thus ideally suited for use in piezoelectric ink jet devices.

However, the substrate to which they are applied could be at a temperature at which the ink has a higher viscosity, such as a viscosity of from $10^5$ to $10^7$ mPa-s. For example, the substrate may be maintained at a temperature of 50° C. or below, preferably from 0° C. to 50° C., the temperature at the substrate being less than the jetting temperature. Preferably, the substrate temperature is at least 10° C. below the first temperature. More preferably, the substrate temperature is from 10 to 50° C. below the jetting temperature.

By jetting the ink at a temperature at which the ink is a liquid and having the substrate at the temperature at which the ink has a higher viscosity, a phase change can be provided. This phase change may prevent the composition from rapidly soaking into the substrate, avoiding or at least minimizing showthrough. In addition, the substrate is exposed to radiation to initiate polymerization of the curable monomer, leading to a robust image.

The inks can be employed in apparatus for direct printing ink jet processes, wherein when droplets of the melted ink are ejected in an imagewise pattern onto a recording substrate, the recording substrate is a final recording substrate. Alternatively, the inks can be employed in indirect (offset) printing ink jet applications, wherein when droplets of the melted ink are ejected in an imagewise pattern onto a recording substrate, the recording substrate is an intermediate transfer member and the ink in the imagewise pattern is subsequently transferred from the intermediate transfer member to a final recording substrate.

The inks are suited for jetting onto an intermediate transfer substrate, e.g., an intermediate transfuse drum or belt. In a suitable design, the image may be applied by jetting appropriately colored inks during four to eighteen rotations (incremental movements) of the intermediate transfer member with respect to the ink jetting head, i.e., there is a small translation of the printhead with respect to the substrate in between each rotation. This approach simplifies the printhead design, and the small movements ensure good droplet registration. Transfuse, i.e., a transfer and fusing step, is desirable in forming the image as transfuse enables a high quality image to be built up on a rapidly rotating transfer member. This approach simplifies the printhead design, while the small movements of the head ensure good droplet registration. Transfuse typically involves jetting the ink from the ink jet head onto an intermediate member such as a belt or drum, i.e., the transfuse member. This procedure allows the image to be rapidly built onto the transfuse member for subsequent transfer and fusing to an image receiving substrate.

The intermediate transfer member may take any suitable form, although it is preferably a drum or belt. The member surface may be at room temperature, although in embodiments it is preferable to heat the member such that a surface temperature thereof is maintained within a narrow temperature range so as to control the viscosity characteristics of the inks over a wide range of environmental conditions. This temperature is preferably at or below the second temperature. In this way, the ink is maintained on the surface of the transfer member until transfer to the image receiving substrate.

Once upon the intermediate transfer member surface, the jetted ink may be exposed to radiation to a limited extent so as to effect a limited curing of the ink upon the intermediate member surface. This intermediate curing is not to cure the ink to its full extent, but merely to assist in setting the ink up so that it may be transferred to the image receiving substrate with the appropriate amount of penetration, which requires the ink droplets to have a certain rheology before transfer. For controlling the extent of the curing if an intermediate cure is practiced, reference is made to Co-pending application Ser. No. 11/034,850 filed Jan. 14, 2005, incorporated herein by reference. This intermediate curing step may not be needed since the phase change is generally sufficient to impart the desired rheology to the ink droplets.

Following jetting to the intermediate transfer member and optional intermediate curing thereon, the ink is thereafter transferred to an image receiving substrate. The substrate may be any suitable material such as paper, boxboard, cardboard, fabric, a transparency, plastic, glass, wood etc., although the ink is most preferably used in forming images on paper. Following transfer to the substrate, the image on the substrate is exposed to radiation having an appropriate wavelength, mainly the wavelength at which the ink initiator absorbs radiation, to initiate the curing reaction of the ink. The radiation exposure need not be long, and may be for, e.g., about 0.05 to about 10 seconds, more preferably from about 0.2 to about 5 seconds. These exposure times are more often expressed as substrate speeds of the ink passing under a UV lamp. For example, the microwave energized, doped mercury bulbs available from UV Fusion (Gaithersburg, Md.) are placed in an elliptical mirror assembly that is 10 cm wide; multiple units may be placed in series. Thus, a belt speed of 0.1 ms$^{-1}$ would require 1 second for a point of an image to pass under a single unit, while a belt speed 4.0 ms$^{-1}$ would require 0.2 s to pass under four bulb assemblies. The radiation to cure the polymerizable components of the ink is preferably provided by a variety of possible techniques, including but not limited to a xenon lamp, laser light, D or H bulb, etc. The curing light may be filtered, if desired or necessary. The curable components of the ink react to form a cured or crosslinked network of appropriate hardness. Preferably, the curing is substantially complete, i.e., at least 75% of the curable components are cured (polymerized and/or crosslinked), to allow the ink to be substantially hardened, and thereby to be much more scratch resistant, and also to adequately control the amount of showthrough on the substrate.

When an indirect printing process is used, the intermediate transfer member can be of any desired or suitable configuration, such as a drum or roller, a belt or web, a flat surface or platen, or the like. The intermediate transfer member can be heated by any desired or suitable method, such as by situating heaters in or near the intermediate transfer member, or the like. The intermediate transfer member may also be cooled by situating fans nearby or heat exchange with a cooled fluid. Optionally, a layer of a sacrificial liquid can be applied to the intermediate transfer member prior to ejecting the droplets of melted ink onto the intermediate transfer member, whereby the melted ink droplets are ejected onto the sacrificial liquid layer on the intermediate transfer member, as disclosed in, for example, U.S. Pat. No. 5,389,958. Transfer from the intermediate transfer member to the final recording substrate can be by any desired or suitable method, such as by passing the final recording substrate through a nip formed by the intermediate transfer member and a back member, which can be of any desired or effective configuration, such as a drum or roller, a belt or web, a flat surface or platen, or the like.

The present disclosure is also directed to a printer containing the inks described herein. Specifically, the present disclosure relates to a printer cartridge containing the inks described herein, as well as to a printer containing the printer cartridge.

EXAMPLES

The following examples illustrate specific embodiments of the present disclosure. One skilled in the art would recognize that the appropriate reagents, component ratio/compositions may be adjusted as necessary to achieve specific product characteristics. All parts and percentages are by weight unless otherwise indicated.

Preparation of UNILIN 350 Acrylate

UNILIN 350 is a hydroxyl-terminated polyethylene wax available from Baker-Petrolite (Sand Springs, Okla.). It has an $M_n$ approximately equal to 375 g/mol.

UNILIN 350-acrylate is an acrylate-modified wax based on UNILIN 350. UNILIN 350-acrylate was prepared as follows: To a 2 L three neck flask equipped with a reflux condenser, dropping funnel, thermometer, and Dean-Stark trap was added UNILIN 350 (200 g, hydroxyl number 125.80 mg KOH/g, 80 wt %, obtained from Baker Petrolite, Tulsa, Okla.), p-toluenesulfonic acid (1.99 g, 0.8 wt %, obtained from Sigma-Aldrich Co., Milwaukee, Wis.), hydroquinone (0.25 g, 0.1 wt %, obtained from Sigma-Aldrich Co., Milwaukee, Wis.) and toluene (600 mL). The reaction mixture was heated until dissolved. Acrylic acid (46 mL, 19 wt %) was added slowly by the addition funnel. The reaction was allowed to reflux until water ceased collecting in the Dean-Stark trap. Completion of the reaction was confirmed by $^1$H NMR spectroscopy in toluene-$d_8$ (80° C.): the methylene protons adjacent to the hydroxyl group ($\delta 3.38$, t) were consumed and replaced by a series of triplets between $\delta 4.27$ and 3.97, representing $RCH_2C\underline{H}_2OOCCH:CH_2$. At the end of the reaction, the mixture was cooled to room temperature and filtered. The solid was triturated with methanol, filtered, and dried in a vacuum oven. The toluene filtrate was concentrated in vacuo, triturated with cold methanol, filtered, and dried in a vacuum oven. In total, 156 g of a yellow solid (broad mp ca. 50° C.) was recovered. $^1$H NMR (300 MHz, toluene-$d_8$, 80° C.) $\delta$ 6.29-6.19 (1H, $dd_1$, $J_{dd1}$=17.3, 1.7 Hz and $dd_2$, $J_{dd2}$=17.3, 1.7 Hz), 6.03-5.94 (1H, $dd_1$, $J_{dd1}$=17.3, 10.4 Hz and $dd_2$, $J_{dd2}$=17.3, 10.4 Hz), 5.36-5.33 (1H, $dd_1$, $J_{dd1}$=10.4, 1.7 Hz and $dd_2$, $J_{dd2}$=10.4, 1.7 Hz), 4.27 (0.6H, t, J=6.5 Hz), 4.21 (0.3H, t, J=6.4 Hz), 4.06-3.96 (2.5H, $t_1$, $J_{t1}$=6.7 Hz and $t_2$, $J_{t2}$=6.7 Hz), 2.42-2.29 (0.9H, m), 2.28-2.16 (0.4H, m), 1.65-1.43 (3.6H, m), 1.43-1.25 (104H, m), 0.91 (5.8H, t, J=6.5 Hz).

Examples 1-6

Inks 1-6 were made containing the components listed in Table 1.

TABLE 1

| Component | Function | Ink Formulation (wt %) | | | | | |
|---|---|---|---|---|---|---|---|
| | | 1 | 2 | 3 | 4 | 5 | 6 |
| Unilin 350 acrylate wax | Reactive wax; phase change agent | 48.4 | 39.6 | 29.7 | 29.7 | 29.7 | 29.7 |
| SR9003 (propoxylated neopentyl glycol diacrylate, a low viscosity monomer from Sartomer Company, Inc.) | Reactive monomer | 40.7 | 49.5 | 59.4 | 54.4 | 54.4 | 54.4 |
| CN2262 (polyester acrylate oligomer from Sartomer Company, Inc.) | Reactive oligomers | — | — | — | 5.0 | — | — |
| SR399LV (dipentaerythritol pentaacrylate ester from Sartomer Company, Inc.) | | — | — | — | — | 5.0 | — |
| EB 812 (acrylated polyester oligomer from UCB Chemicals) | | — | — | — | — | — | 5.0 |
| Irgacure 379 (α-amino ketone photoinitiator from Ciba Specialty Chemicals, Inc.) | Photoinitiators | 2.9 | 2.9 | 2.9 | 2.9 | 2.9 | 2.9 |
| Irgacure 2959 1-[4-(2-hydroxyethoxy)-phenyl]-2-hydroxy-2-methyl-1-propane-1-one from Ciba Specialty Chemicals, Inc.) | | 2.9 | 2.9 | 2.9 | 2.9 | 2.9 | 2.9 |
| Darocur ITX (2-isopropyl-9H-thioxanthen-9-one from Ciba Specialty Chemicals, Inc.) | | 1.9 | 1.9 | 1.9 | 1.9 | 1.9 | 1.9 |
| Irgastab UV 10 (a radical scavenger from Ciba Specialty Chemicals, Inc.) | Stabilizer | 0.2 | 0.2 | 0.2 | 0.2 | 0.2 | 0.2 |

TABLE 1-continued

| | | Ink Formulation (wt %) | | | | | |
|---|---|---|---|---|---|---|---|
| Component | Function | 1 | 2 | 3 | 4 | 5 | 6 |
| Eastman red-magenta olefin dye | Colorant | 3.0 | 3.0 | 3.0 | 3.0 | 3.0 | 3.0 |

The inks were formulated as follows: The reactive wax (prefiltered to 2 μm), monomer, oligomer (optional), photoinitiators and stabilizer were heated to 100° C. with stirring. After 30 min at this temperature, the colorant was added and the resulting ink was stirred for 1 h longer. Each ink was pipetted onto a glass slide as a liquid at 100° C. and exposed to UV light from a UV Fusion LC-6B Benchtop Conveyor equipped with UV Fusion F300S Ultraviolet Lamp System employing a "D" bulb for about 5 s. The cured samples were heated at 100° C. for 30 min and did not completely remelt, indicating that polymerization had occurred.

Ink 1 was filtered to 2 μm and jetted onto three different types of paper: Xerox Digital Colour Gloss (80 lb), International Paper Hammermill Laser Print (24 lb) and Xerox Premium Multipurpose 4024 (24 lb). No showthrough was observed on the Gloss and Hammermill papers and showthrough was minimal on the 4024 paper. If prints were left uncured overnight, ink began to soak through the Hammermill and 4024 papers, indicating the ink had formed a robust polymer after exposure to UV light.

The rheological profiles of these inks are depicted in the FIGURE. The viscosities were measured on a Rheometrics Fluid Spectrometer RFS3 with cone and plate geometry equipped with a Peltier plate at a frequency of 1 Hz.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. A method for forming an image on a substrate, said method comprising:
    (a) providing a radiation curable ink comprising curable monomer that is liquid at 25° C., curable wax, and colorant at a first temperature;
    (b) applying said radiation curable ink to the substrate to form an image, said substrate being at a second temperature, the second temperature being below the first temperature; and
    (c) exposing the radiation curable ink to radiation to cure the ink,
    wherein the second temperature is below the first temperature by at least 10° C.

2. The method according to claim 1, wherein said first temperature is at least 60° C. and said second temperature is below 50° C.

3. The method according to claim 1, wherein said radiation curable ink is applied to the substrate by ink jet printing.

* * * * *